F. R. Wilson,
Steam-Engine Valve-Gear.
Nº 82,190. Patented Sep. 15, 1868.
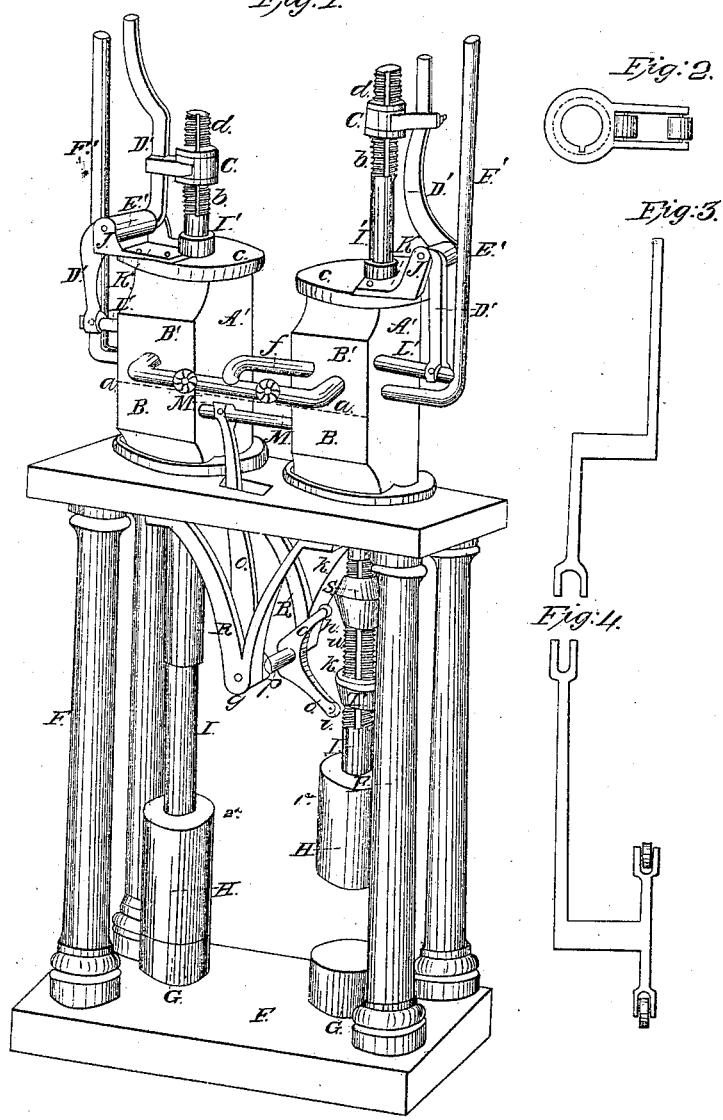

United States Patent Office.

FURMAN R. WILSON, OF PHILADELPHIA, PENNSYLVANIA.

Letters Patent No. 82,190, dated September 15, 1868.

---

IMPROVEMENT IN VALVE-GEAR FOR STEAM-ENGINES.

---

*The Schedule referred to in these Letters Patent and making part of the same.*

---

TO ALL WHOM IT MAY CONCERN:

Be it known that I, FURMAN R. WILSON, of the city of Philadelphia, State of Pennsylvania, have invented new and useful Improvements in the Manner of Working the Valves of the Cylinders of Steam Stamping-Mills, and the valves of other steam-cylinders; and I do hereby declare that the following is a full, clear, and exact description of the construction of the same, reference being had to the annexed drawings, forming part hereof, and to the letters of reference marked thereon.

The nature of my invention consists of a combination of mechanism for operating the valves which admit steam into the cylinders below the pistons, and also a combination of mechanism for operating the valves which admit steam into the cylinder above the piston, for the double purpose hereinafter mentioned.

To enable others skilled in the art to make and use my improvements, I will proceed to describe their construction and mode of operation.

Figure 1 is a perspective view of a steam stamping-mill with my improvements added.

Figure 2 represents a top view of the upper cam, C' C', showing the two rollers between which the levers D' D' slide.

Figure 3 represents a side view of the levers D' D'.

Figure 4 represents a side view of the lever O O O.

In fig. 1, F F is a strong frame, of wood or iron, supporting a bed-plate, on which is secured, in an upright position, the cylinders A' A', and B' B' are the valve or steam-chests, through which is a partition running horizontally, as shown by the dotted line *a a*, having for its object the prevention of the conflicting of the valves inside the valve or steam-chests L L, and M M are the valve-rods or stems, connecting with their operating-levers D' D' and O O O, and with the valves on the inside of the chests B' B' and B B. The valves are the common slide-valve, each moving over two ports, one for the induction of steam to the cylinders, the other for eduction of steam from the cylinders. The motion of the valves and valve-rods is at right angles with the motion of the pistons, and the valve-rods extend out of the valve-chests, opposite to each other, on the same cylinders. The induction-ports, for admitting steam into the cylinders below the piston, are nearest the side of the steam-chests that the valve-rods lead out of, and the eduction-ports, for exhausting the steam below the piston, are in the side farthest from the side the valve-rods M M lead out of. The induction-ports, that admit steam into the cylinder above the piston, are farthest from the side the valve-rods L' L' lead out of, and the eduction-ports, for exhausting steam above the piston, are nearest the side the valve-rods L' L' lead out of; consequently, to admit steam below the piston, the valve-rods M M have to be pushed in, and to open the exhaust-ports, the rods have to be drawn out. The valve-rods M M are connected together; therefore, when one rod is pushed in, to open the induction-port below the piston of one cylinder, the rod of the other side is drawn out, to close the induction-port of that side, and open its eduction-port, thereby producing an alternate motion of the piston. I I are the piston-rods or stamp-stems, with the stamps H H attached, and I' I' are a continuation of the stamp-stems or piston-rods through the cylinders A' A'. D' D' are the levers for operating the upper valves, the upper or long arm of which extends or projects from one end of the hubs E' E', and has a bend or slant towards the outer ends, for the purpose of having the cam C' C', on the upper ends of the piston-rods, act on the bent portion of the lever while the piston is ascending, thereby causing the induction-port above the piston to open, for the purpose of arresting or cushioning the piston, and give it the downward motion, when the cam C' C' again acts on the bent portion of the lever, causing it to close the induction-port above the piston, and open the eduction or exhaust-port.

At the opposite end of the hubs E' E', which forms the fulcra of the levers D' D', through which hubs pass the fulcrum-pins J J, and on which the levers move, are the short arms of the levers D' D', connecting with the valve-rods or stems L' L'. The fulcrum-pins J J are supported by the lugs K K, which are bolted to the cylinder-heads *c c*. *b b* is a screw-thread cut upon the upper end of the piston-rods I' I', for the purpose of moving the cams C' C' to any desired position, thereby causing them to act on the bent portion of the levers, causing them to open the ports for admission of steam above the pistons, at any desired length of the stroke of the pistons, while on their upward stroke. $d\ d$ are key-slots cut in the screw-thread on the upper end of the piston-rods $I'\ I'$, to fit a corresponding slot in the cams $C'\ C'$, for the purpose of inserting the keys $e\ e$, to keep the cams from moving from any desired position. $f f$ are steam-pipes, for conveying steam from the boiler to the cylinders, and have common stop-cocks, so that one or both stamps can be run, as desired. $F'\ F'$ are the exhaust-pipes, for the exhaust-steam to escape. O O O is the lever for operating the valves which admit steam below the piston, and has the hub P, through which is the fulcrum-pin $g$, supported by the standards R R. At one end of the hub P is the long arm of the lever, connecting with the valve-rods M M. At the other end of the hub are two short arms, with the rollers $h$ and $i$ on the ends, for the purpose of avoiding friction while in contact with the cams T and S. The cam S is elliptical in shape, and has a screw-thread and key-slot cut on the inside, to fit a corresponding thread and slot on the rods or stamp-stems I I, as shown at U. The cam T is of a conical shape, inverted, with a screw-thread and key-slot cut on the inside, to fit the thread and slot on the piston-rod at U. $k\ k$ are the keys for holding the cams T and S in position. G G are the dies for the stamps H H to strike upon.

The cams $C'\ C'$ are composed of two parts, an outside and inside part. The inside part may be called a round nut, with a flange on each end. The round nut fits on the end of the piston-rods $I'\ I'$, and has a screw-thread and key-slot cut on the inside, to fit the thread and slot on the rods $I'\ I'$. The other or outside part of these cams has a projection on one side, with two rollers in it, sufficiently distant from each other to admit of the long arm of the levers $D'\ D'$ passing between them, as shown in fig. 2. The object of the rollers is to overcome the friction of the cam while traversing up and down on the long arm of the levers $D'\ D'$. The part of these cams that has the projection and rollers is on the outside of the round nut, or part that screws into the piston-rods, and is within the flanges, in such a manner as to admit of the inside part turning with the piston-rods when the levers are between the rollers.

Having described my invention, I will describe the operation of the same; and to facilitate the same, and make it more readily understood, I will designate one cylinder, with its valves, levers, cams, &c., as the first side, and the other cylinder, with its appliances, as the second side.

When the stamps are at rest, and before the steam is turned on, both the stamps will be on the dies G G. The cam T will be in contact with the lower short arm of the lever O O O, at the point where the friction-roller $i$ is, and has moved that arm of the lever, causing the long arm of the lever to move the valve-rods M M, drawing one out of the valve-chest of the second side, and pushing one into the valve-chest of the first side, thereby closing the induction-port of the second side below the piston, and opening the induction-port below the piston of the first side. As the valve-gear is all automatic, or rather governed by the motion of the piston, as soon as steam is turned on, the induction-port of the first side, below the piston, being open, the piston begins to ascend, when the elliptical cam S, coming in contact with the other short arm of the lever O O O, at the roller $h$, reversing the position of the valve-rods M M, thereby closing the induction-port of the first side, and opening the induction-port of the second side, below the piston of that (second) side, thereby causing the piston to ascend, while the cam $C'$, on the upper end of the piston-rod of the first side is operating on the bent portion of the lever $D'$, causing it to open the induction-port above the piston of the first side, thereby forcing the piston of that (first) side down, while the piston of the second side is ascending, to operate the lever $D'$ on that (second) side, to force its piston down as soon as the cam T causes the lever O O O to close the induction-port below the piston of the second side, and open the induction-port below the piston of the first side, thereby producing an alternate motion of the pistons.

What I claim as my invention, and desire to secure by Letters Patent, is—

1. The arrangement of the adjustable cams $C'\ C'$, composed, as described, with reference to the screw-thread $b$ on the piston-rod $I'$, and the key $e$ and key-slot $d$, substantially as herein shown and described, and for the purpose set forth.

2. The lever O O O, with its two short arms, having the rollers $h$ and $i$ arranged with reference to the valve-rods M M and cams T and S, upon the piston-rod I, substantially as herein described, and for the purpose set forth.

3. The cams S and T, being both arranged on one piston-rod, in combination with the lever O O O, substantially as described, and for the purpose set forth.

FURMAN R. WILSON.

Witnesses:
R. L. M. CAMDEN,
JAS. C. MILLIGAN.